United States Patent Office 3,378,310
Patented Apr. 16, 1968

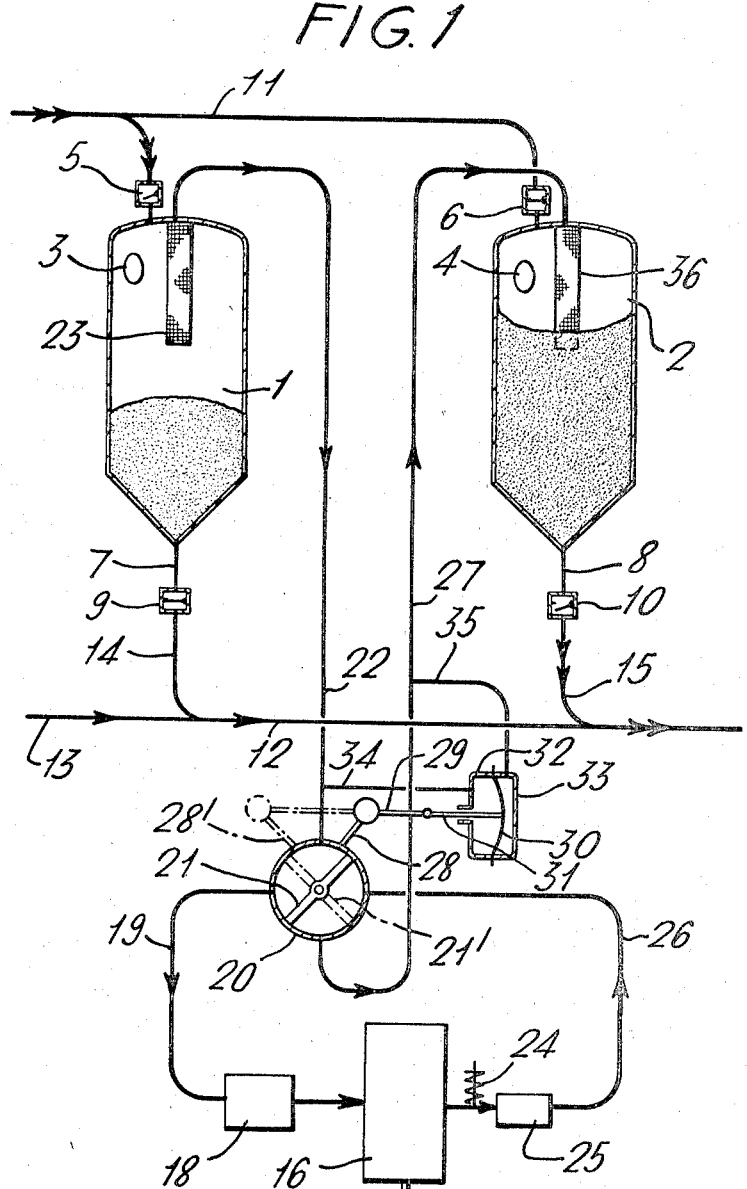
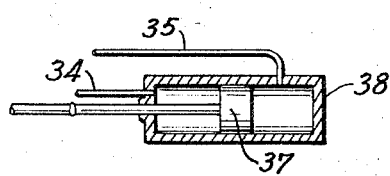

3,378,310
GRAIN CONVEYOR
Hans Christensen, Visse, near Gug, Denmark, assignor to J. Morch & Sonner A/S, Sonder Tranders, Denmark
Filed Jan. 24, 1966, Ser. No. 522,799
Claims priority, application Denmark, Feb. 23, 1965, 93,065/65
6 Claims. (Cl. 302—17)

ABSTRACT OF THE DISCLOSURE

A closed circuit pneumatic grain conveyor system for continuously conveying granular material comprising two vessels, one connected as a pressure vessel and the other as a vacuum vessel, means for switching the function of both vessels simultaneously, and an air displacement means centrally disposed within said closed system.

This invention relates to a pneumatic grain conveyor for the continuous conveyance of grain, provided with means for air displacement, e.g. a blower of the Rootes type, and comprising at least two vessels for alternately drawing in and expelling the granular material by suction, each vessel comprising a grain inlet with a one-way valve and a grain outlet with a one-way valve.

It is known to move grain by sucking the load of grain to be moved into a storage vessel, from which the grain is forwarded to its destination, such as a grain store, a truck or another suitable storage means. This mode of transportation is discontinuous, and in order to avoid delays for the person unloading the grain, it is necessary to use very large vessels in which the grain is temporarily stored.

It is also known to use pneumatic grain conveying systems comprising two tanks or vessels, one of which is being loaded from an overhead silo simultaneously while emptying the other vessel by means of the combined action of compressed air, air suction and air blast.

In conveyors of this type it is a drawback that loading of a tank must take place by drawing off the material from a silo or by means of chutes from a mechanical conveyor, because this operation considerably complicates the means of transportation which will be tied to a permanent location.

When moving grain from ships to permanent silo systems, in which case the grain must be delivered invariably at the same spot, or in the case where expensive stationary or mobile distribution plants are justified, the grain may be moved by means of large suction systems in which the air displacement means or the suction piping is arranged above the top of the conveying system.

In loading grain from the farmers' grain stores or similar storage means into a truck, or unloading from the truck to a wholesale grain store, or into a railway freight car, none of the transportation systems mentioned above are suitable. Consequently means for transporting or moving the grain have been developed, in which the grain is sucked up from the storing place and into a suction vessel from which it is delivered to a vessel underneath through a rotary vane feeder. Through an intermediary filter the suction stud of a blower is connected with the suction vessel, and the pressure stud of the same blower is connected with the lower vessel, thus forwarding the grain by means of air blast.

This method in itself is very flexible and suitable for mobile conveying systems enabling them to be installed in an ordinary motor truck and may be used where the widest possible independence regarding the arrangement of the machinery in relation to loading point as well as unloading point is desired.

It is, however, a serious disadvantage in this prior art method, that it necessitates the use of a vane wheel which must be and remain airtight during the use, causing the conveyor system to be expensive and requiring an exacting production and maintenance. With certain types of grain and grainy materials further, it is a nuisance, that the vane feeder wheel will crush part of the grain during the rotary movement.

It is therefore an object of this invention to provide a continuously working pneumatic grain conveyor system, suitable for loading and unloading grain between rapidly changing loading and unloading points at different positions and in relation to the conveyor system, partially by utilizing a design avoiding vane feeders or other equally exacting means demanding expert care and which are subject to rapid wear in use, partially by utilizing a design of low weight, avoiding the comparatively heavy rotating vane wheels, and in which the position of the air displacement machinery in relation to the loading point as well as the unloading point is of minor importance for the functioning and economy of the conveyor system.

In order to obtain this effect the grain conveyor system is so designed in accordance with the invention, that each vessel is connected with a pipe for alternating suction and compressed air delivery, and that the system—for switching from suction to expulsion of one vessel with simultaneous switching from expulsion to suction in another vessel—is provided with switching means, e.g. a valve or a cock, interconnected with the suction side of the air displacement means and with a vessel acting temporarily as suction vessel, and simultaneously interconnected with the pressure side of the air displacement means and with a pressure vessel.

This arrangement provides an uninterrupted suction and delivery of grain from respectively two grain stores, which may be situated at any levels relative to each other, and it is not necessary to employ shovels, bucket conveyors, belt conveyors or other mechanical means at the loading point of the system.

Having loaded one of the vessels, it is possible without any interruption in the grain conveyance, to switch over to another vessel, and the first vessel subsequently may be blown empty simultaneously with the other vessel being sucked full of grain. The vessels may be quite small, as they do not serve as storing vessels, because in view of the mode of employment, it is not necessary for them to be able to hold the whole contents of a grain store, even temporarily, before they are emptied again by means of compressed air.

In this specification the word "grain" means grain used for feeding purposes and breadstuff, but also any other type of granular bulk supplies suitable for pneumatic conveyance.

With the aim of simplifying the making and maintenance of the grain conveyor system in accordance with the invention, the system is further so designed that as a switching means it has a four-way valve, thus providing a simple switching means for which the control of the switching movement is very simple, and the air resistance of the switching means will be very small.

The grain conveyor system according to the invention may be so designed that the switching means are controlled by the difference in pressure between a suction vessel and a pressure vessel respectively of the suction and the pressure pipes of these vessels.

In this manner it will be possible to utilize in the switching operation the positive increase in vacuum arising in a suction vessel when running full of grain, and a very simple and reliable automatic control of the necessary alternation between pressure and suction in the vessels is obtained.

An exceedingly simple and reliable control of the switching means is obtained by directly or indirectly controlling the switching means by a diaphragm or a piston interposed between a suction vessel and a pressure vessel or between the suction pipe of a suction vessel and the pressure pipe of a pressure vessel.

The switching from suction to pressure will be extremely reliable if the grain conveyance system according to the invention is so constructed that the compressed air/suction pipe is connected with the vessels through a filter projecting to some extent in a vertical direction, by which means a gradual increase of vacuum is obtained during the subsequent part of the suction period due to the decrease in free filter area during the loading of the vessel with grain. The switching means are adapted by known means to effect instantaneous switching over in order that no throttling arises in the switching means.

An embodiment of a grain conveyor system in accordance with the invention will be further explained by means of the drawings in which:

FIGURE 1 shows diagrammatically the construction of such a grain conveying system, and FIGURE 2 shows a modification of the switching device.

Referring to FIGURE 1, two vessels 1 and 2 are provided at the top with grain inlets 3, 4 having inwardly opening one-way valves 5, 6. At the bottom the vessels have grain outlets 7, 8 with outwardly opening one-way valves 9, 10.

The inlets are connected with a common grain suction pipe 11, whereas the outlets are connected with a common grain blowing pipe 12 to which an auxiliary pipe 13 is connected for the addition of extra air, which may be derived from the air displacement means of the system or from any other source of compressed air, and which serves to avoid the clogging of grain in the blow line 12 or its inlet studs 14, 15. A blower of the Rootes type 16 is driven by means of an electric motor 17, and thus sucks air from a suction pipe 19 through a filter 18, further through one half of the four-way cock or valve 20 having a valve plate 21. From the valve 20 the suction will spread through another suction pipe 22 to the vessel 1, the suction pipe 22 being interconnected with a filter 23 disposed centrally in the top of the vessel.

From the blower 16 the air is expelled past a safety relief valve 24, through a silencer 25 and further through a pressure pipe 26 to the other half of the four-way valve 20, from which the air is conducted through another pressure pipe 27 to a filter 36 in the upper part of the vessel 2.

The valve plate 21 is connected to a shaft provided with means for securing an instantaneous changing of the position of the valve, when the valve plate shaft torque exceeds a certain preselected value. The valve plate shaft and the instantaneous switch means are not shown in the drawing.

For switching the valve to a position 21′, converting the suction vessel 1 into a pressure vessel and simultaneously converting the pressure vessel 2 into a suction vessel, the shaft (not shown in the drawing) of the valve plate 21 is provided with a lever 28. The lever 28 may be switched over by hand, the tops of the vessels being provided with windows or vacuum meters, by which means it is possible to see when a vessel is running full.

More conveniently the switching over may be produced automatically, if the lever 28 is articulated on a connecting rod 29, which in turn is articulated on a push rod 31 fixed to the diaphragm 30. The diaphragm is stretched across a diaphragm housing 32, 33, from which sensing pipes 34, 35 extend to the air displacement pipelines 22, 27.

It is obvious that an increased vacuum in the vessel 1 due to the loading of the vessel with grain and the accompanying covering of an increasingly larger area of the filter 23 will increase the vacuum to the left of the diaphragm 30, and subsequently will overcome in time the resistance of the quick-switching means, causing the lever 28 to be shifted to the position 28′ and the valve plate 21 to be shifted to the position 21′.

Alternately, a piston arrangement may be substituted for the diaphragm switching system as discussed above. In FIGURE 2 is shown such an arrangement with the push rod 31 fixed to a piston 37 in a cylinder 38. Sensing pipes 34 and 35 are connected to the cylinder, one on each side of piston 37. Pipes 34 and 35 extend to the air displacement pipe lines 22 and 27.

In operation, an increased vacuum in vessel 1 due to the loading of the vessel with grain and the accompanying covering of an increasingly larger area of the filter 23 will increase the vacuum to the left of piston 37, causing the lever 28 to be shifted to the position 28′ and the valve plate 21 to be shifted to the position 21′.

In FIGURE 1 the single arrows indicate the direction of the movement of the air, whereas the double arrows indicate how the grain is moving, if and when the valve 21 is in a position as shown in full lines. The grain conveyor system in accordance with the invention is, in view of its reliability and simple construction, very well suited for use in places where expert attendance is not available, for instance on farms, and in view of its relatively low weight and the possibility of compact construction it is also well suited for mobile and automotive conveyor systems.

The term "grain conveyor system" does not indicate any restriction to conveyor systems for breadstuff and for grain for feeding purposes, but the installation is obviously equally well suited for any other granular product, flour or the like, which is suited for pneumatic conveyance.

What is claimed is:

1. A pneumatic grain conveyor system for continuously conveying granular material comprising at least two vessels for receiving and discharging the granular material, conduit means connecting each vessel at an inlet end to a supply source of the granular material and at an outlet end to a delivery point for the granular material, an air circuit including air displacement means and valve means, air conduit means extending from said valve means to each vessel, said valve means containing valve flow control means movable between two operative positions, switch means for actuating said valve flow control means to alternately connect one of said vessels to the suction side of said air displacement means for drawing the granular material into one vessel and expelling it from another vessel, and simultaneously connecting the other vessel through said valve means to the pressure side of said air displacement means, for providing a closed air circulating system.

2. A pneumatic grain conveyor system according to claim 1 wherein said valve means is a four-way valve and the flow control means is a valve plate rotatable between said two operative positions.

3. A pneumatic grain conveyor system according to claim 2 wherein the position of the valve plate is controlled by the difference in pressure in said vessels and in said air conduit means.

4. A pneumatic grain conveyor system according to claim 3 wherein the position of the valve plate is controlled by a diaphragm mounted in a pressure housing connected between two opposite pressure sides of said air conduit means.

5. A pneumatic grain conveyor system according to claim 3 wherein the position of the valve plate is controlled by a piston member mounted in a piston chamber connected between two opposite pressure sides of said air conduit means.

6. A pneumatic grain conveyor system according to claim 3 wherein a filter is mounted in each vessel and is connected to said air conduit means.

References Cited
UNITED STATES PATENTS

| | | | |
|---|---|---|---|
| 590,084 | 9/1897 | Blanchard | 302—21 |
| 2,852,127 | 9/1958 | Barrett | 198—139 |
| 3,069,205 | 12/1962 | McIver et al. | 302—17 |

ANDRES H. NIELSEN, *Primary Examiner.*